Patented Mar. 19, 1946

2,396,665

UNITED STATES PATENT OFFICE 2,396,665

PARASITICIDAL PREPARATIONS

Elbert C. Ladd, Passaic, N. J., assignor to United States Rubber Company, New York, N. Y., a corporation of New Jersey No Drawing. Application September 16, 1944, Serial No. 554,540

14 Claims. (Cl. 167—32)

This invention relates to new and useful improvements in parasiticidal preparations, more particularly to germicides, that is, fungicides and bactericides, and to preparations for repelling insects, including larvae, arachnids and acarids. The invention further relates to methods of protecting organic materials subject to attack by low orders of organisms, as the immunizing of seed, and the mildewproofing of fabrics and other material.

I have found that 2-chloronaphthoquinhydrone-1,4 is effective for destroying or checking the growth of fungi and bacteria and repelling insects. The 2-chloronaphthoquinhydrone-1,4, which is believed to be a new compound, may be prepared by reacting equimolar proportions of 2-chloronaphthoquinone-1,4 and 2-chloronaphthalenediol-1,4. The 2-chloronaphthoquinone-1,4 is a pale yellow solid having a melting point of 102–117° C. This compound and method of preparation are described in Beilstein's "Handbuch der Organischen Chemie," vol. 7, page 729 (4th Ed.). The 2-chloronaphthalenediol-1,4 may be prepared from the 2-chloronaphthoquinone-1,4 by reduction, as by treating an aqueous suspension of the 2-chloronaphthoquinone-1,4 with stannous chloride. The 2-chloronaphthalenediol-1,4 is a white solid of melting point 138–140° C. The 2-chloronaphthoquinhydrone-1,4 may be prepared by mixing equimolecular quantities of 2-chloronaphthoquinone-1,4 and 2-chloronaphthalenediol-1,4 and preferably warming sufficiently to complete or hasten completion of the reaction. The reaction is complete when the reactants have been converted to a purple solid. The reaction may be prepared if desired in the presence of a solvent or diluent. For example, 2.5 parts of 2-chloronaphthalenediol-1,4 and 2.4 parts of 2-chloronaphthoquinone-1,4 (parts by weight) may be dissolved together in acetone and then evaporated to dryness on a steam bath. The resultant 2-chloronaphthoquinhydrone-1,4 is a purple solid having a melting point of 142–143° C. The color of the 2-chloronaphthoquinhydrone-1,4 and its melting point are ample evidence that the material is a quinhydrone and not a physical mixture. The structure of the 2-chloronaphthoquinhydrone-1,4, in accordance with the accepted usage in designating quinhydrones generally, may be represented as follows:

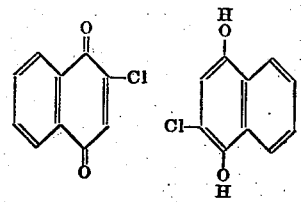

The 2-chloronaphthoquinhydrone-1,4 may be used as a seed protectant and to protect plants, including plant parts, or soil from organisms harmful to seeds and plants. It may also be applied to prevent or retard fungus growth and the formation of mildew, for example, on organic material, such as rope, wood, fur, hair, feathers, cotton, wool, leather, rubber, rubberized or synthetic resin coated fabric, and the like. The 2-chloronaphthoquinhydrone-1,4 may be applied as a dust, undiluted or mixed with a solid carrier, such as clay or talc, or as a spray in a liquid carrier, as in solution in a suitable solvent, or in suspension in a non-solvent, for example, water. It may be used admixed with carriers that are active of themselves, for example, other fungicides, germicides, or insect repellents, or insecticides, fertilizers, hormones, buffering or safening agents.

The following examples are given to illustrate the invention:

Example I

Pea seed variety Perfection were tumbled with various proportions of 2-chloronaphthoquinhydrone-1,4 in dust form. The seeds were then planted in soil known to be infected with a number of organisms including *Pythium ultimum*. The effectiveness of the compound as a fungicide was determined by comparing the numbers of seeds which germinated and developed into healthy plants from equal numbers of treated and untreated seeds planted under the same conditions. Observations were made at the end of 10 days on the seeds treated with various dosages of the 2-chloronaphthoquinhydrone-1,4. The results are shown in the following table:

| Dosage of 2-chloronaphthoquinhydrone-1,4 in percent of seed weight | Percent germination after 10 days | |
| --- | --- | --- |
| | Treated | Untreated |
| 1 | 85 | .23 |
| 0.125 | 60 | 25 |

Example II

The evaluation of 2-chloronaphthoquinhydrone-1,4 against several commonly occurring fungi using the "slide technique" described by S. E. A. McCallan et al., Contributions of Boyce-Thompson Instituted 4, 233 (1932); 9, 249 (1938); 10, 329 (1939); 12, 431 (1942 is given in the following table: In all cases the concentration of the 2-chloronaphthoquinhydrone-1,4 was one part per million suspended in water containing .00625% Nacconal NR (a proprietary dispersing agent which is the sulphonated condensation product of chlorinated kerosene with benzene).

| Fungus treated | Percent ungerminated spores | |
|---|---|---|
| | Treated | Untreated |
| Metarrhizium spp. | 100 | 0 |
| Glomerella gossypii | 100 | 0 |
| Alternaria solani | 100 | 0 |
| Sclerotinia fructicola | 100 | 0 |
| Do | 98 | 0 |

Example III

This case illustrates the effectiveness of 2-chloronaphthoquinhydrone-1,4 as a bactericide. 5% by weight of finely divided 2-chloronaphthoquinhydrone-1,4 was suspended in water which contained 2% of Emulphor EL (believed to be the reaction product of fatty acid or fatty acid ester with ethylene oxide) as a dispersing agent. Pieces of diced carrot were immersed in this suspension and allowed to stand at room temperature. No growth of naturally occurring bacteria was observed after 30 days. On the other hand, pieces of diced carrot treated in a similar way with a 2% solution of Emulphor EL in water, which solution did not contain a germicide, became heavily overgrown with naturally occurring bacteria within the same period of time.

Example IV

The insect repellent properties of 2-chloronaphthoquinhydrone-1,4 are shown by the following test: .5 part by weight of 2-chloronaphthoquinhydrone-1,4 in finely ground form was dispersed in 200 parts of water containing .001 part by weight of Nacconal NR. Two young bean plants with the first true leaves fully expanded were sprayed with this aqueous suspension of 2-chloronaphthoquinhydrone-1,4 in amount sufficient to wet the entire leaf surfaces. The plants were then placed in an insect cage and infested with ten Mexican bean beetle larvae. Two other young bean plants were sprayed with a solution comprising .001 part of Nacconal NR in water but not containing any other added chemical, and were similarly infested with Mexican bean beetle larvae at the same time. After six days it was observed that only 10 to 15% of the leaves of the treated plants had been eaten, whereas the leaves of the control plants treated only with the aqueous solution of Nacconal NR were completely skeletonized.

Having thus described my invention, what I claim and desire to protect by Letters Patent is:

1. As a new chemical, 2-chloronaphthoquinhydrone-1,4.
2. An insect repellent composition comprising a carrier and 2-chloronaphthoquinhydrone-1,4 as an active ingredient.
3. A fungicidal composition comprising a carrier and 2-chloronaphthoquinhydrone-1,4 as an active ingredient.
4. A fungicidal composition comprising a liquid carrier and 2-chloronaphthoquinhydrone-1,4 as an active ingredient.
5. A germicidal preparation comprising an aqueous suspension of 2-chloronaphthoquinhydrone-1,4 containing a dispersing agent.
6. The method of repelling insects from plants which comprises treating plants with 2-chloronaphthoquinhydrone-1,4.
7. The method of protecting organic material subject to attack by low orders of organisms which comprises treating said organic material with 2-chloronaphthoquinhydrone-1,4.
8. The method of immunizing seed which comprises treating said seed with 2-chloronaphthoquinhydrone-1,4.
9. The method of controlling fungi on plants which comprises treating said plants with 2-chloronaphthoquinhydrone-1,4.
10. The method of destroying fungus which comprises subjecting said fungus to the action of 2-chloronaphthoquinhydrone-1,4.
11. The method of controlling mildew on organic material which comprises treating said organic material with 2-chloronaphthoquinhydrone-1,4.
12. The method of combating insects which comprises applying 2-chloronaphthoquinhydrone-1,4 to the insect host.
13. The method of combating fungi, bacteria and insects which comprises treating material liable to attack by said fungi, bacteria and insects with a composition containing 2-chloronaphthoquinhydrone-1,4.
14. The method which comprises applying 2-chloronaphthoquinhydrone-1,4 to loci to be protected against insects.

ELBERT C. LADD.